(Model.)
S. E. HURLBUT.
Wrench.
No. 242,130.          Patented May 31, 1881.
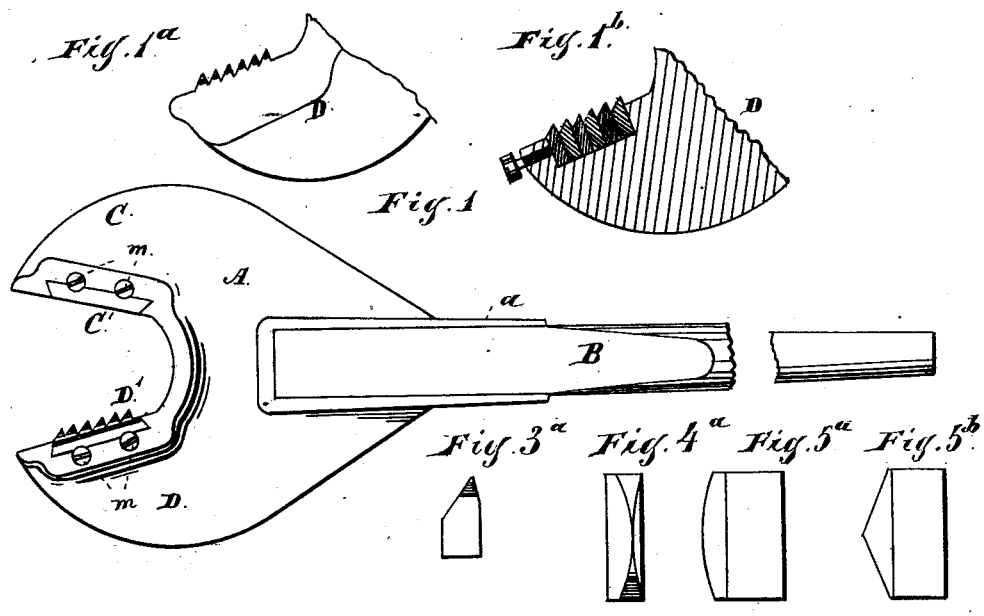
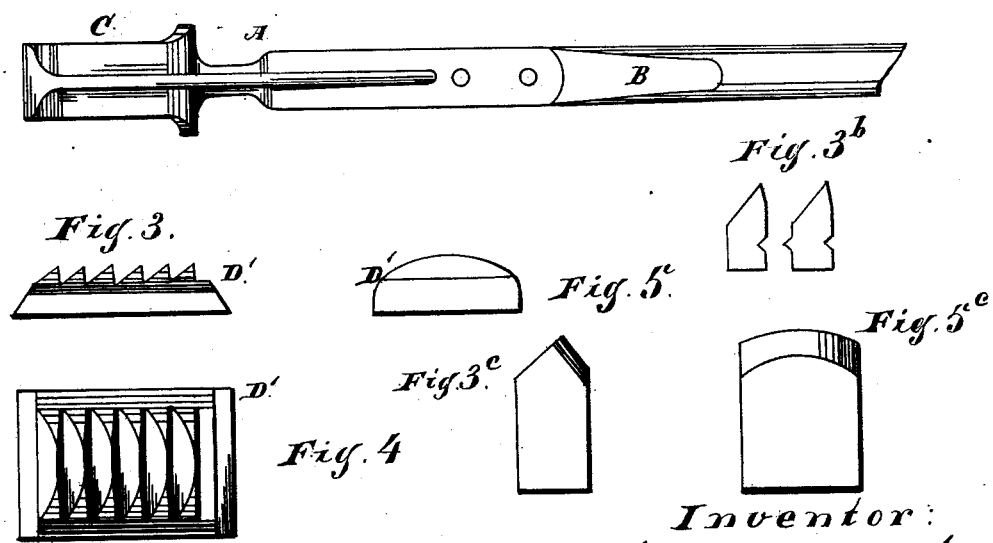
Witnesses:          Inventor:
Seth E. Hurlbut

UNITED STATES PATENT OFFICE.

SETH E. HURLBUT, OF CHICAGO, ILLINOIS.

WRENCH.

SPECIFICATION forming part of Letters Patent No. 242,130, dated May 31, 1881.

Application filed October 16, 1880. (Model.)

*To all whom it may concern:*

Be it known that I, SETH E. HURLBUT, of the city of Chicago, in the county of Cook and State of Illinois, have made certain new and useful Improvements in Wrenches, of which the following is the specification.

Figure 1 is a view of my improved wrench, showing the shape and form of the diverging jaws, together with the handle. Fig. 2 is a view of the wrench from one edge. Fig. 3 is a view of the inserted teeth in one of the diverging jaws. Fig. 4 is a top view of Fig. 3. Fig. 5 is an end view of Figs. 3 and 4. Fig. 1$^a$ is a partial view of one of the jaws, showing the teeth cut in the jaw. Fig. 1$^b$ shows a vertical section of the jaw with individual teeth in position in the jaw and held there by set-screw. Figs. 3$^a$, 4$^a$, 5$^a$, 4$^b$, 5$^b$, 3$^c$, and 5$^c$ show different forms of individual teeth.

Similar letters of reference refer to similar parts in the different drawings.

The nature and object of my invention is to construct a wrench for clasping and turning round surfaces, such as gas-pipe, rods, &c.

I construct my wrench with two fixed diverging jaws, similar in form, as shown in Fig. 1, in which C and D are the fixed diverging jaws, and A is the body, having a slot with two arms, of which $a$ is one, with another exactly like it immediately opposite, and in this slot is placed the handle B. At the foot of the slot is a mortise in the head A, and on the handle is a tenon which fits into this mortise. The handle is held in position by one or more bolts passing through the two arms $a$ and handle B, as shown in Fig. 2.

I do not limit myself to using a wooden handle, as it will be seen readily that I can make the entire wrench—that is, the two jaws C and D and body and handle B—in one piece out of any suitable metal.

In one of the jaws I place a series of teeth, D′, Fig. 1, while the opposite jaw is left with a smooth surface, as at C′, Fig. 1. These teeth may be inserted as in Fig. 1, or cut from the jaw, as shown in Fig. 1$^a$. They also may be formed a solid body, as in Fig. 3, and inserted as in Fig. 1, by being dovetailed and wedged with screws $m$; or they may be made individually and inserted as shown in Fig. 1$^b$, and held in position by set-screw, as shown in said figure. The shape of the biting-edge of the teeth is made with the center higher than the outer corners or external ends, as shown at D′, Fig. 5. This biting-edge may be made oval, as shown at D′, Figs. 5, 5$^a$, and 5$^c$; or it may be made gable form, as shown in Fig. 5$^b$. The individual teeth I make with flat smooth sides, as shown in Figs. 5$^a$, 5$^b$, 5$^c$, 3$^c$, and Fig. 1$^b$, or with a lip or projection on one edge or side fitting into a corresponding recess in the adjoining tooth, as in Fig. 3$^b$. The teeth are made with a sharp cutting-edge, as shown in the various figures, with one side of the cutting-edge beveled more than the other. I also make the bevel on the front side of the tooth rounding slightly, as shown in Fig. 4$^b$, which is a top view of an individual tooth. When rounded in this form the cutting-edge extends the entire width of the tooth. When the front is beveled straight across the central portion of the cutting-edge is sharp, while the outer portions of the edge are blunt, as shown at Figs. 4 and 4$^a$.

I desire to call particular attention to the form of the cutting-edge of the teeth, as upon this, in a great measure, depends the value of my improvement. As I have before mentioned, I make the cutting-edge of the tooth either oval, as in D′, Figs. 5 and 5$^a$, or gable form, as in Fig. 5$^b$. Preferably I make them oval, as in Fig. 5.

I am aware that wrenches have been made with diverging jaws having teeth on one jaw, with the opposing jaw made smooth, and also that these teeth extended directly across the jaw and at right angles with the side of the jaw; and, also, I am aware that this form of wrench has been made with the teeth extending obliquely across the jaw. Neither of these embrace my invention.

I make my teeth with the oval or gable form edge. I have found in experience that when the biting-edge of the teeth is straight, whether they extended directly across the face of the jaw or in an oblique line, if the slightest movement of the handle is made in a lateral direction, when in the act of using the wrench, the teeth are broken off either in whole or in part, while by making the teeth with the center of the cutting-edge higher than at either end of the tooth—that is, oval or gable—this difficulty is entirely obviated.

The wrench can be put to the heaviest work, requiring the united strength of several workmen, and a lateral movement of several inches can be given to the handle without any injury to the teeth. I make them of various sizes, adapted to round surfaces of small or greater diameter, and use them for a variety of purposes. As a car-shunter it has proven of especial value by applying it to the car-axle in the same manner that you would to a round rod. The form of the tooth herein shown makes it especially adapted to this business, as great power is required to move loaded cars, and to apply this power without more or less lateral movement of the lever is exceedingly difficult; but by making the teeth as herein shown no difficulty arises from any lateral movement of the lever. The same is also the case in using this wrench on small rods or pipe. No breaking or injuring of the teeth arises from this lateral movement of the lever.

By making the teeth, individually or singly, as shown in Fig. 1ᵇ, any tooth can be replaced by a new one by loosening the set-screw.

The opposing smooth-surfaced jaw is provided with a hardened surface, C', as shown in Fig. 1.

In case the front surface of the cutting-edge is beveled off straight, then the ends of the cutting-edge are left blunt. If it is beveled off slightly rounding, then the cutting-edge is sharp its entire length. It is no matter what the shape of the tooth is, provided the central portion of the cutting-edge is higher or extends above the ends of the cutting-edge.

What I claim is—

1. A wrench having fixed diverging jaws, the inner surface of one of which is smooth, and the inner face of the opposite jaw having teeth formed with the central portion of the cutting-edges of the teeth elevated above the edges of the same at their outer extremities, substantially as shown, and for the purpose described.

2. A wrench having the two fixed diverging jaws C and D, the inner surface of one jaw being smooth and the inner surface of the opposite jaw provided with individual inserted teeth, the same having the central portion of their cutting-edges elevated above their edges at their outer extremities, substantially as shown, and for the purpose described.

SETH E. HURLBUT.

Witnesses:
  JAS. A. COWLES,
  FRANK SAYRE OSBORNE.